United States Patent [19]

Lin

[11] Patent Number: 5,606,210

[45] Date of Patent: Feb. 25, 1997

[54] POWER GENERATOR BY MAGNETICALLY REPULSING MAGNETIC SHUTTLES

[76] Inventor: Tieng-Fu Lin, c/o Hung Hsing Patent Service Center, P.O. Box 55-1670, Taipei, Taiwan

[21] Appl. No.: 528,920

[22] Filed: Sep. 15, 1995

[51] Int. Cl.[6] ................................................. H02K 21/22
[52] U.S. Cl. ........................ 310/153; 310/152; 310/164; 310/266; 322/4
[58] Field of Search ................................ 322/4, 40, 46; 310/152, 153, 164, 266

[56] References Cited

U.S. PATENT DOCUMENTS

| | | | |
|---|---|---|---|
| 3,610,974 | 10/1971 | Kenyon | 310/49 |
| 3,821,575 | 6/1974 | Colosimo | 310/266 |
| 4,532,448 | 7/1985 | Welburn | 310/163 |
| 4,892,079 | 1/1990 | Umezu et al. | 123/602 |
| 5,077,515 | 12/1991 | At. Arnauld | 322/4 |

Primary Examiner—Steven L. Stephan
Assistant Examiner—Nicholas Ponomarenko

[57] ABSTRACT

A power generator includes a fly wheel rotatably driven by a driving device, a plurality of magnetically repulsive magnets circularly disposed in an extension ring annularly formed on the fly wheel, a plurality of shuttle magnets circularly secured in a carrier ring positioned adjacent to the extension ring with the carrier ring rotatably engageable in a guiding-rail ring, and a plurality of coil windings circumferentially wound around the guiding-rail ring, each repulsive magnet having a front pole facing a rear pole of each shuttle magnet and the rear pole of the shuttle magnet having a polarity as same as that of the front pole of the repulsive magnet, whereby upon a rotation of the fly wheel to rotate the extension ring and the plurality of magnetically repulsive magnets secured in the extension ring, the shuttle magnets in the carrier ring will be rotatably repulsed by the magnetically repulsive magnets to induce current flowing through the coil windings wound on the guiding-rail ring for generating power.

8 Claims, 7 Drawing Sheets

POWER GENERATOR BY MAGNETICALLY REPULSING MAGNETIC SHUTTLES

BACKGROUND OF THE INVENTION

A conventional power generator includes an armature having wire conductor coiled around an iron core and rotatably mounted between two poles of a magnet, with a pair of brushes which rotatably rub a pair of slip rings connected to two ends of the armature for collecting alternating current as produced from the generator; or with a pair of brushes which rotatably contact a commutator consisting of two insulated segments for collecting direct current from the generator.

However, the conventional power generator may have the following drawbacks:

1. When rotating the armature by an external driving force, a partial driving force will be required to overcome the magnetic force between the iron core and the poles of the magnet, thereby consuming input energy for rotating the armature of the conventional power generator.
2. The brushes are rotatably contacted with the slip rings or commutator, thereby producing frictional heat and decreasing the current collection efficiency.
3. The emf of the power generator depends upon the rotating speed, the number of coil windings and the flux density so that a faster rotation of a densely coiled armature between the magnetic poles within a closed generator housing may produce much heat which requires effective cooling for dissipating heat outwardly. Otherwise, the accumulation of heat may influence a smooth operation of the generator and may shorten its service life.

SUMMARY OF THE INVENTION

The object of the present invention is to provide a power generator including a fly wheel rotatably driven by a driving device, a plurality of magnetically repulsive magnets circularly disposed in an extension ring annularly formed on the fly wheel, a plurality of shuttle magnets circularly secured in a carrier ring positioned adjacent to the extension ring with the carrier ring rotatably engageable in a guiding-rail ring, and a plurality of coil windings circumferentially wound around the guiding-rail ring, each repulsive magnet having a front pole facing a rear pole of each shuttle magnet and the rear pole of the shuttle magnet having a polarity as same as that of the front pole of the repulsive magnet, whereby upon a rotation of the fly wheel to rotate the extension ring and the plurality of magnetically repulsive magnets secured in the extension ring, the shuttle magnets in the carrier ring will be rotatably repulsed by the magnetically repulsive magnets to induce current flowing through the coil windings wound on the guiding-rail ring for generating power.

DETAILED DESCRIPTION

As shown in the drawing figures, the present invention comprises: a fly wheel means 1, a driving means 2, and a power generating disk means 3.

The fly wheel means 1 includes: a fly wheel 11 having a perimeter 111 engageable with the driving means 2 to be rotatably driven by the driving means 2, a wheel shaft 12 formed at a center of the fly wheel 11 and rotatably mounted on a holder 122 by means of bearings 121, an inner extension ring 13 and an outer extension ring 14 made of non-magnetic material and concentrically formed on a periphery of the fly wheel 1 with an annular groove 17 defined between the inner and outer extension rings 13, 14 for rotatably engaging a guiding-rail ring 31 of the power generating disk means 3, each extension ring 13 or 14 having a plurality of magnetically repulsive magnets 15 or 16 equally spaced and circularly secured in each extension ring 13 or 14, each magnetically repulsive magnet 15 or 16 having two poles (S, N) of opposite polarity disposed on a front end and a rear end of each repulsive magnet 15 or 16 when the fly wheel 1 is clockwise rotated (R) about an axis 120 of the wheel shaft 12 and initiated for rotation from the front end of each repulsive magnet 15 or 16 to the rear end of the repulsive magnet, two repulsive magnets 15, 16 respectively secured in the inner and outer extension rings 13, 14 having the front ends of the two repulsive magnets 15, 16 in the two extension rings 13, 14 projectively aligned with a radius of the fly wheel 1 and operatively approximating a rear end of each shuttle magnet 32 in the power generating disk means 3 with the rear end of the shuttle magnet 32 having a polarity (such as S pole) as same as that of the front end of each repulsive magnet 15 or 16 for a magnetic repulsion between each shuttle magnet 32 and each repulsive magnet 15 or 16.

The driving means 2 includes: a driving wheel 21 having a driving axle 20 rotatably mounted on a frame (not shown), a driving handle 22 secured to the driving wheel 21 for manually driving the driving wheel 21, and a transmission means 23 selected from a transmission belt and a chain engageable with a perimeter 111 of the fly wheel 1 selected from a belt groove and a chain pulley on the perimeter 111.

Figure 6:
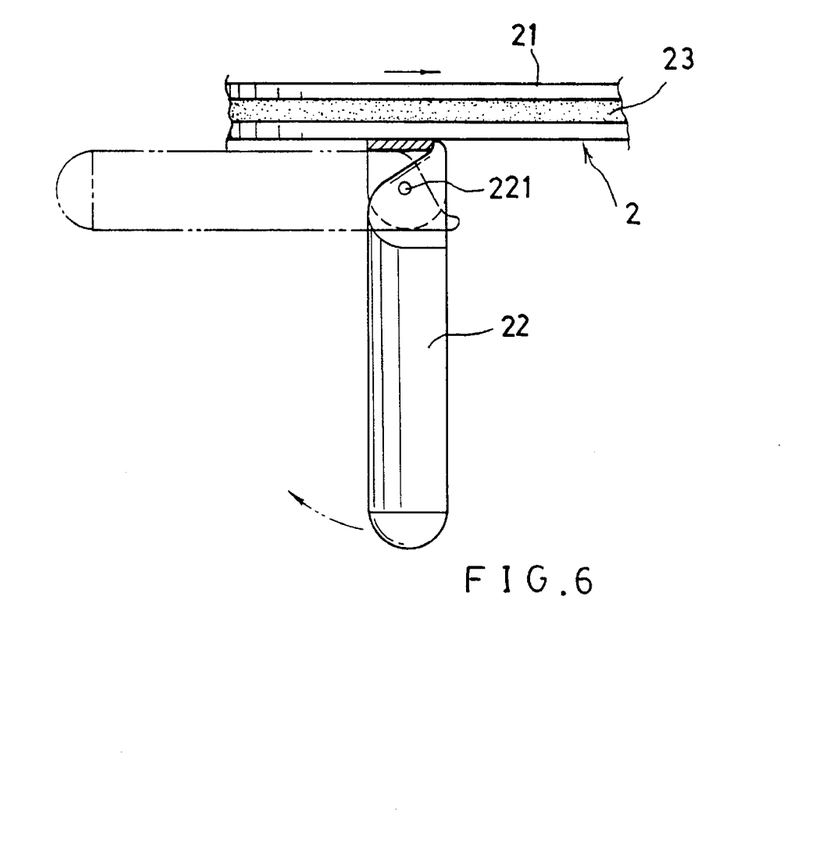
FIG. 6 is a partial top view of the driving means of the present invention.
Figure 7:
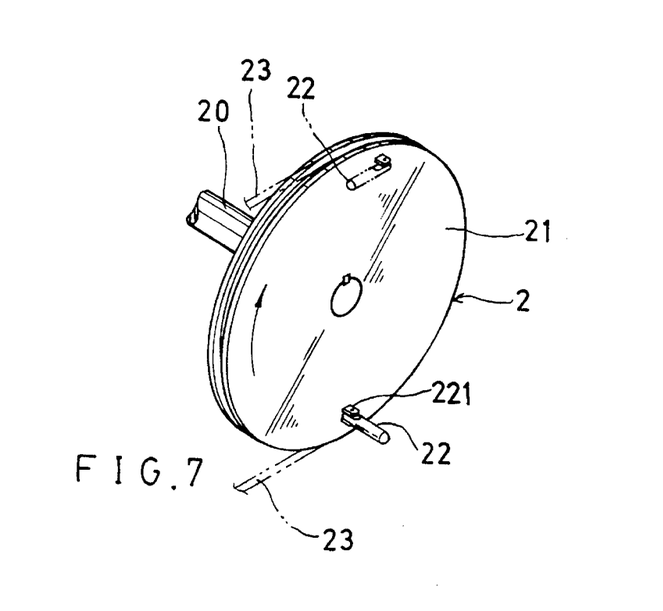
FIG. 7 is a partial perspective view of the driving means.

The driving handle 22 may be pivotally secured to the driving wheel 21 by a pivot 221 as shown in FIGS. 6, 7 in which the driving handle 22 may be retracted to rest upon a wheel surface of the driving wheel 21 when rotated as shown in dotted line of FIG. 7.

The driving means 2 may be driven by an internal combustion engine or by a hydraulic power, or even manually driven such as trodden by an operator's feet. The shaft 12 and the driving axle 20 may be horizontally mounted or vertically erected, not limited in this invention.

The power generating disk means 3 includes: at least a guiding-rail ring 31 made of non-magnetic material and annularly formed on a mounting disk 30 which is supported on a supporting frame 301 standing on a ground surface or other foundations, with the guiding-rail ring 31 rotatably engageable with the annular groove 17 formed in between the inner and outer extension rings 13, 14, a plurality of shuttle magnets 32 equally spaced and circularly secured in a carrier ring 33 having a plurality of shuttle magnet 32 each shuttle magnet 32 having a polarity (such as S pole) on a rear end of the shuttle magnet 32 as same as the polarity of a front end of each repulsive magnet 15 or 16 in the fly wheel means 1 when approximating each repulsive magnet 15 or 16 to each shuttle magnet 32, the carrier ring 33 made of non-magnetic material and slidably rotatable in the guiding-rail ring 31, and a plurality of coil windings 34 equally spaced and respectively wound on the guiding-rail ring 31 to allow each shuttle magnet 32 circularly shuttling in the guiding-rail ring 31 to induce current from each coil winding 34 for outputting alternating current from two output leads 341 on two opposite ends of each coil winding 34.

Figure 5:
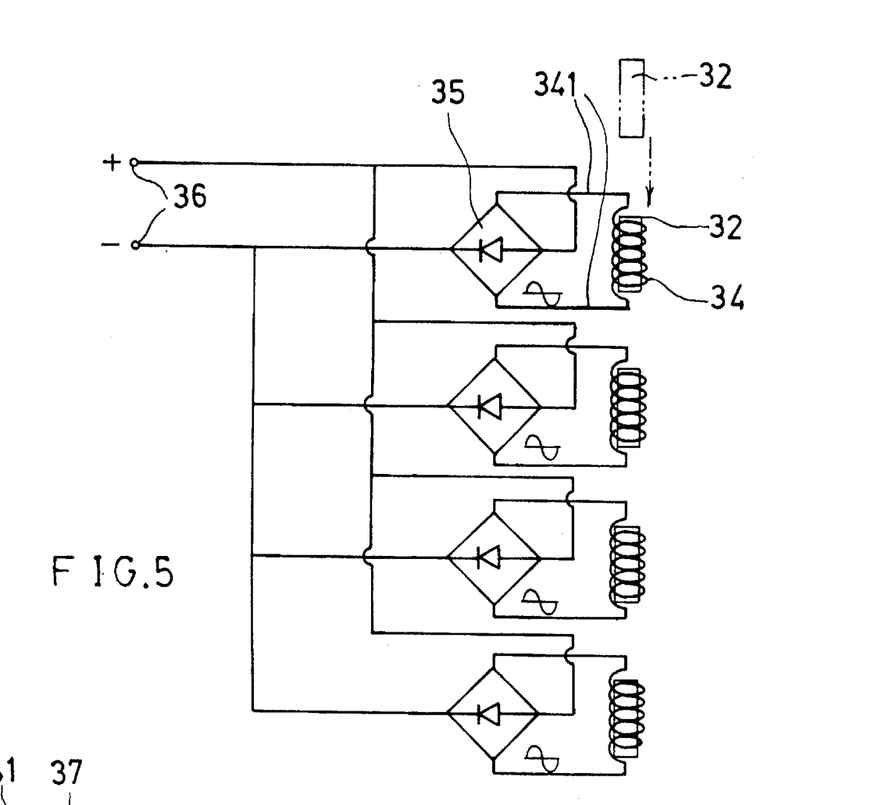
FIG. 5 shows an electric circuit of the present invention for outputting direct current.
Figure 5A:
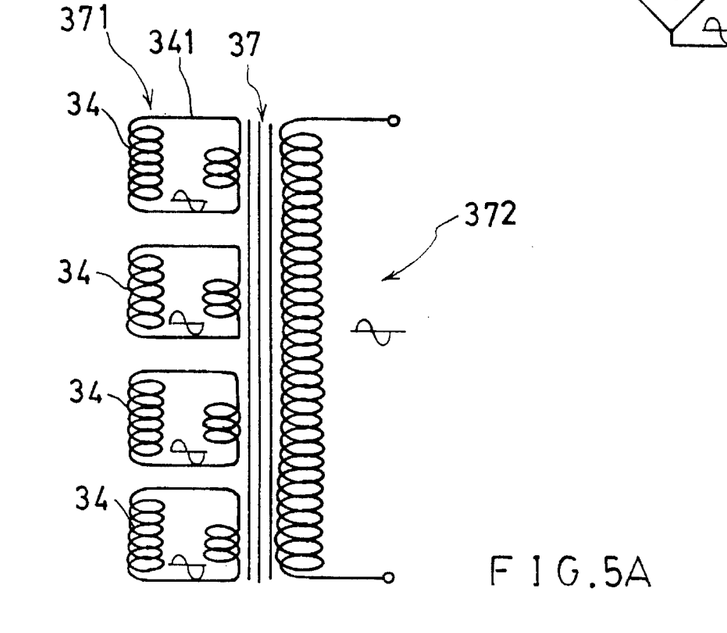
FIG. 5A is an illustration showing the output of alternating current in accordance with the present invention.

The plurality of coil windings 34 are parallelly connected to an input 371 of an alternating current transformer 37 as shown in FIG. 5A for outwardly transmitting an alternating current through an output 372 of the transformer 37 for end use.

Each coil winding 34 has the two output leads 341 connected to a bridge rectifier 35 for rectifying the alternating current from each coil winding 34 to a direct current output from a pair of output terminals 36 connected to the bridge rectifier 35.

The carrier ring 33 is provided with a plurality of locking pins 321 for securing the shuttle magnets 32 in the carrier ring 33 equally spaced from one another. Each shuttle magnet 32 has two poles on a front end and a rear end of the magnet having different polarities (N, S poles) on the front end and rear ends of the magnet 32.

Figure 8:
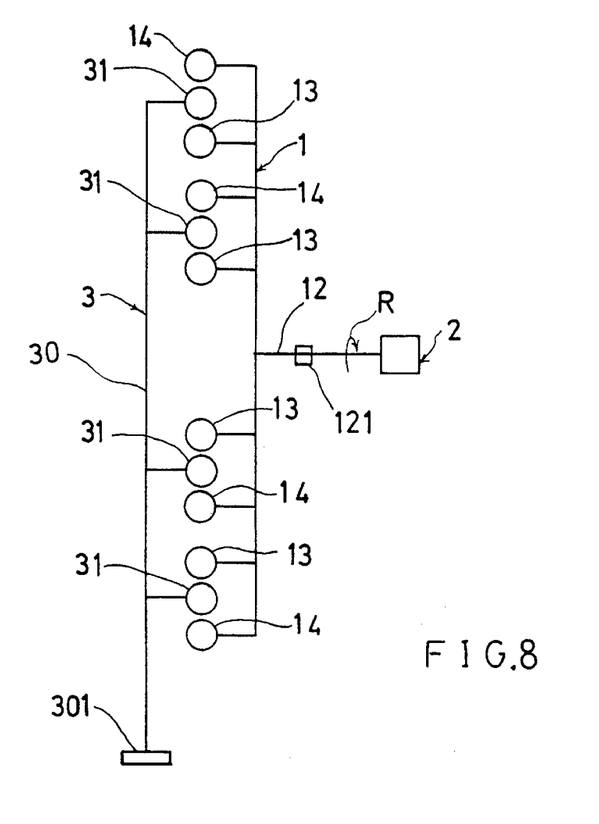
FIG. 8 shows another preferred embodiment of the present invention.
Figure 9:
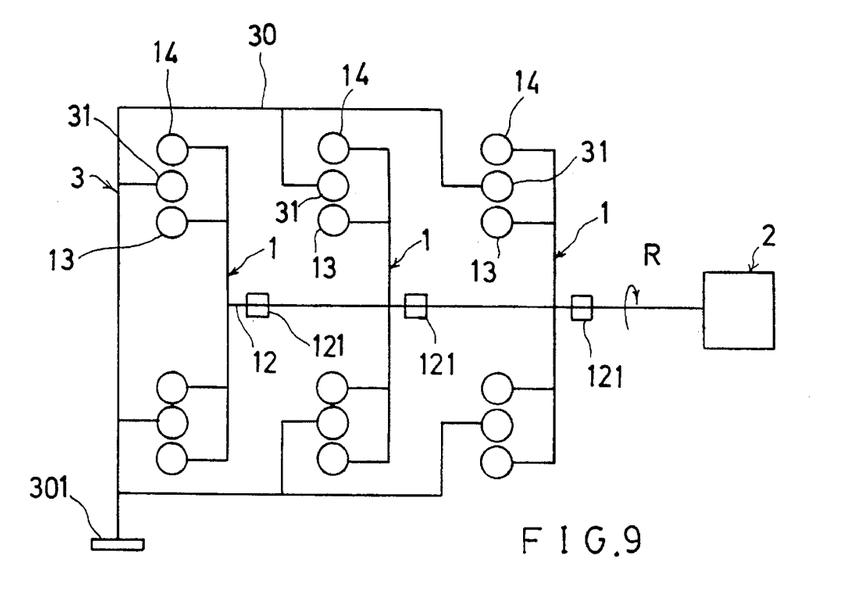
FIG. 9 shows still another preferred embodiment of the present invention.

The number of extension rings 13, 14 and guiding-rail rings 31 may be multiplied as formed on each fly wheel 1 or on the mounting disk 30 of the disk means 3 as shown in FIG. 8; or formed on a plurality of fly wheels 1 and an enlarged mounting disk 30 as shown in FIG. 9 for increasing a total output current as produced from the generator of this invention.

The output current of the present invention may be increased by increasing the number of coil windings 34; increasing the rotation speed of the fly wheel 1; increasing the number of shuttle magnets 32 and increasing the magnetic strength and cross sectional area of each shuttle magnet 32; and by increasing the number of the relevant rings 13, 14, 31, 33 such as shown in FIGS. 8, 9.

Figure 1:
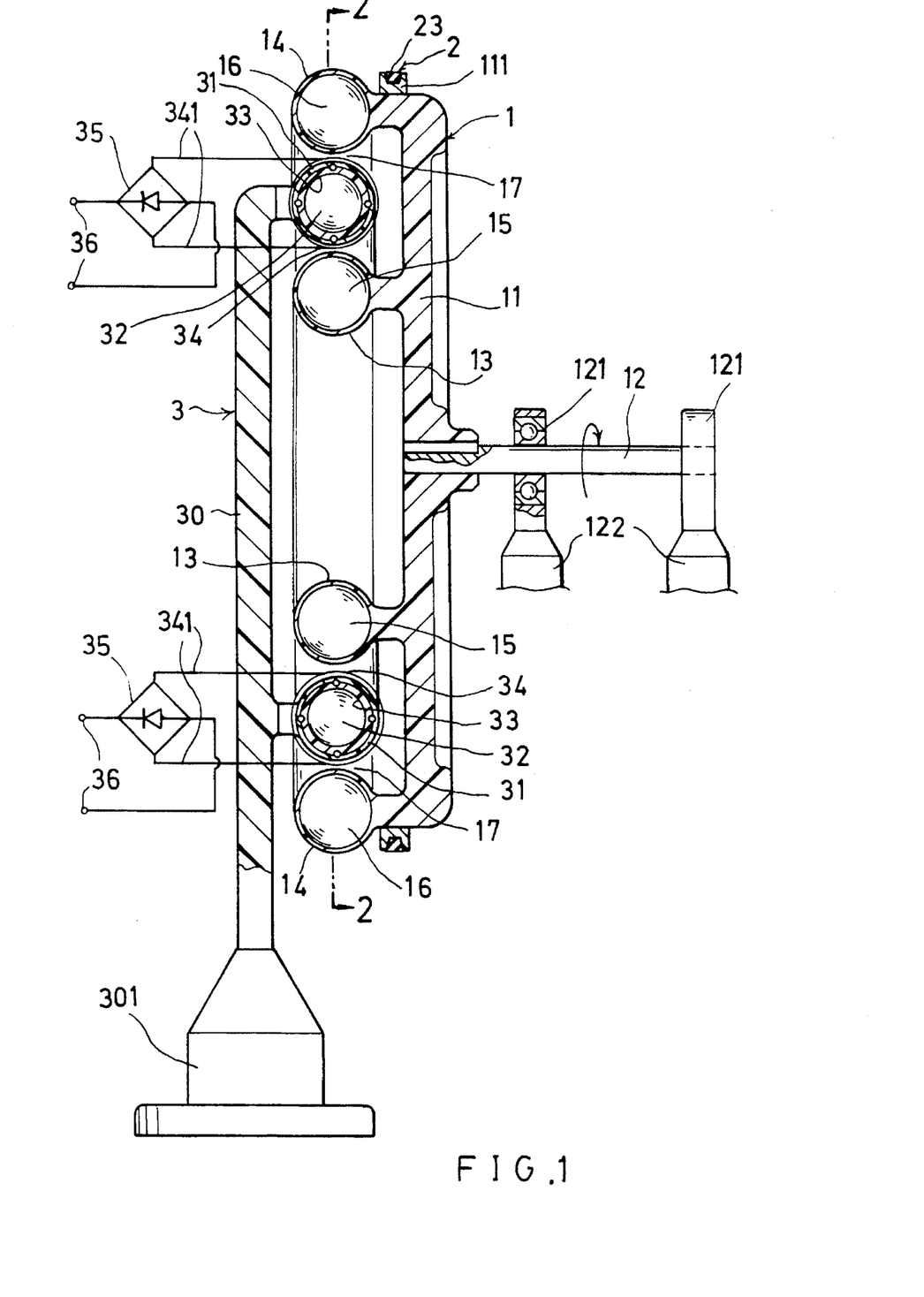
FIG. 1 is an elevational sectional drawing of the present invention.
Figure 1A:
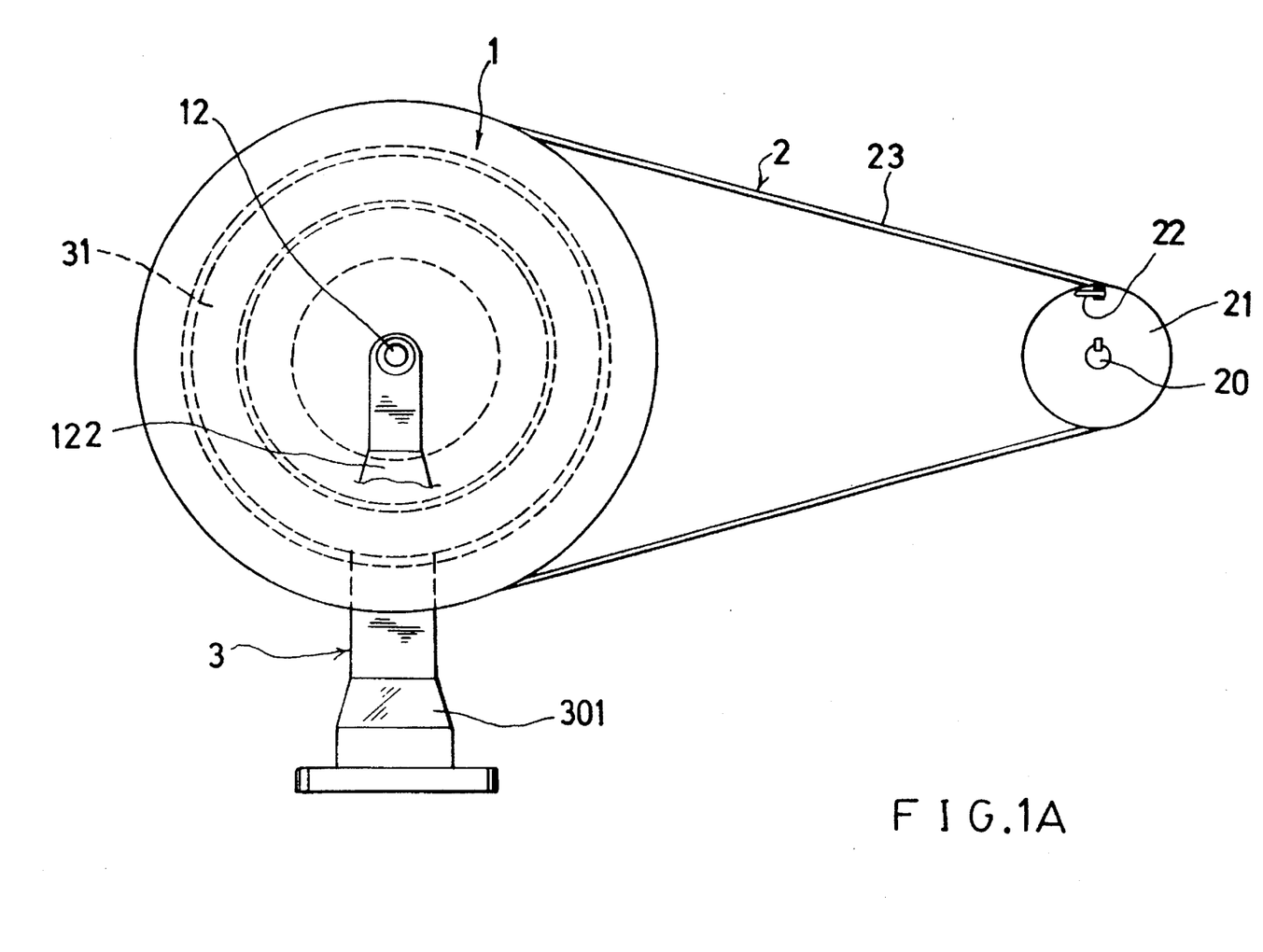
FIG. 1A shows a driving means of the present invention.
Figure 2:
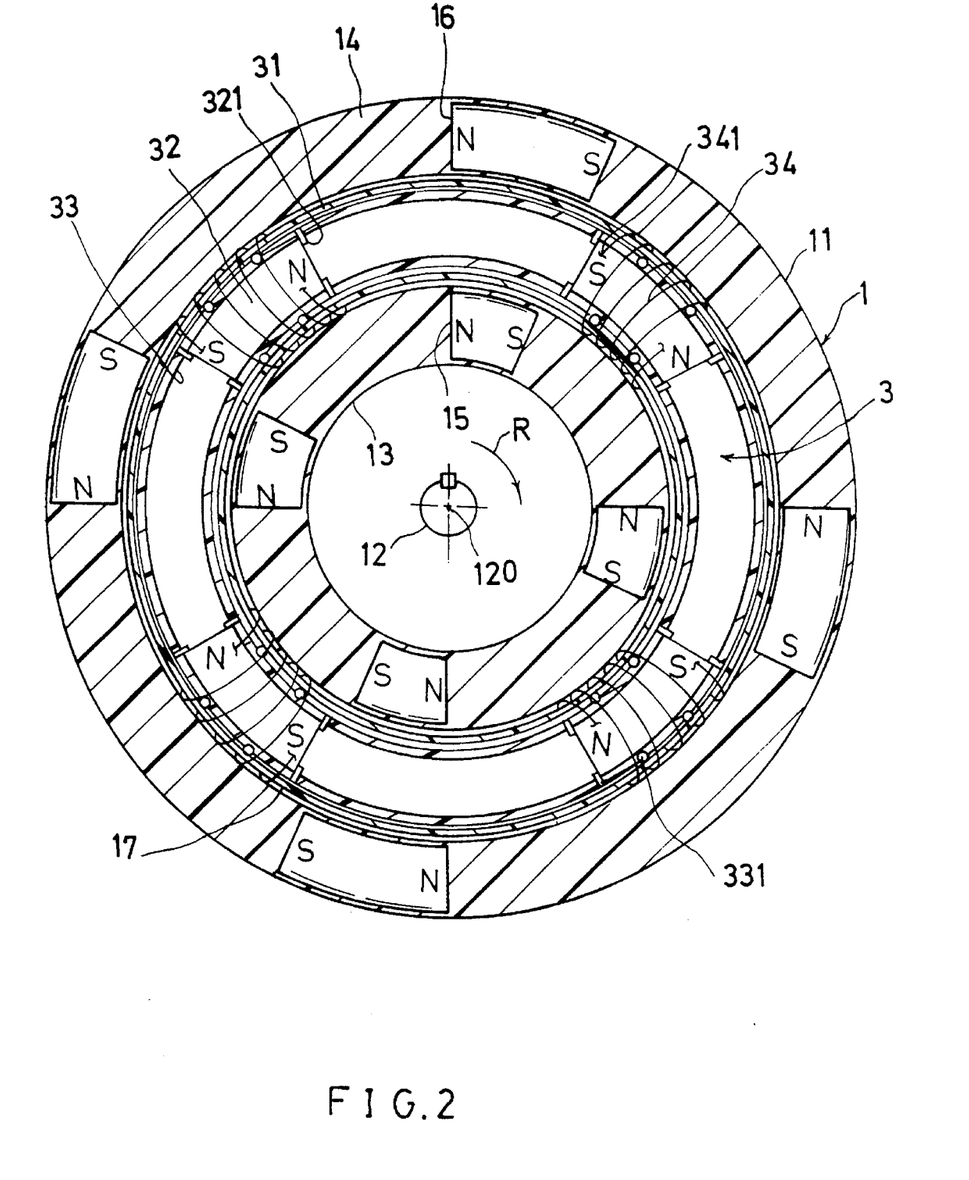
FIG. 2 is a cross sectional drawing of the present invention when viewed from 2—2 direction of FIG. 1.
Figure 3:
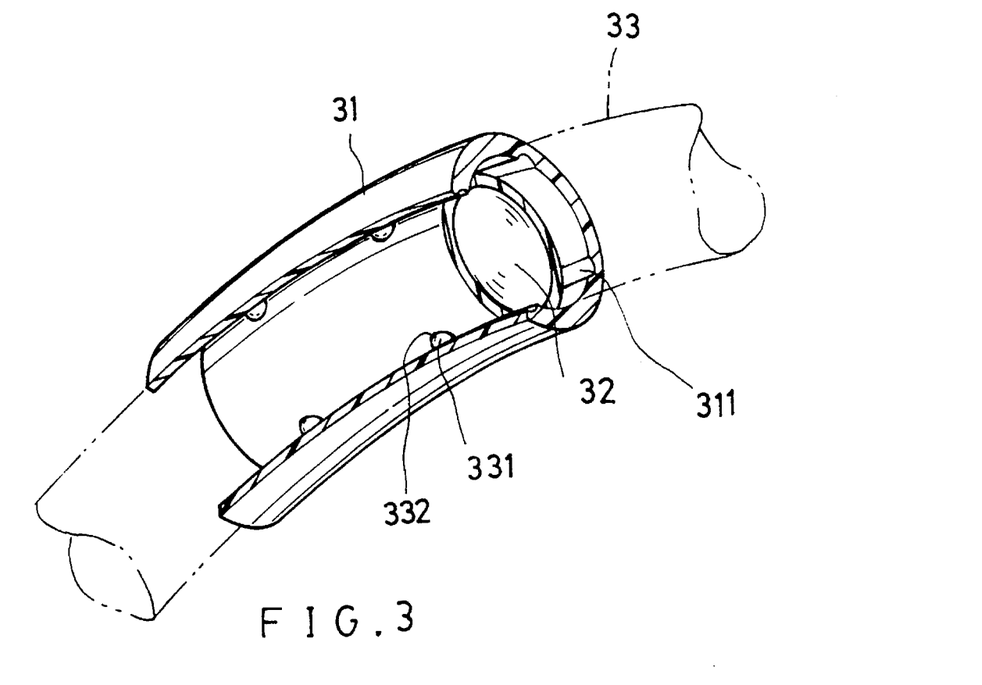
FIG. 3 is a partial perspective view showing a carrier ring and a guiding-rail ring of the present invention.
Figure 4:
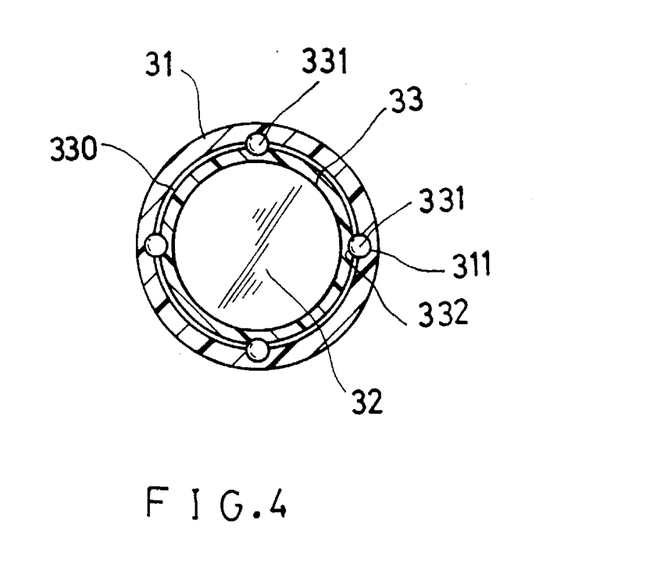
FIG. 4 is a cross sectional drawing of the structure as shown in FIG. 3.

The carrier ring 33 is formed with a plurality of ball recesses 332 recessed in an outer surface of the carrier ring 33 for rotatably engaging a rolling ball 331 in each ball recess 332; and the guiding-rail ring 31 is formed with a plurality of annular grooves 311 concentrically in an inside surface of the guiding-rail ring 31 for rotatably engaging each rolling ball 331 in each annular groove 311 for a smooth rotation of the carrier ring 33 loaded with the plurality of shuttle magnets 32 in the carrier ring 33 within the guiding-rail ring 31 when magnetically repulsed by the repulsive magnets 15, 16 secured on the fly wheel 1 as being rotated.

A lubricating oil 330 may be filled in between the carrier ring 33 and the guiding-rail ring 31 for a smooth relative rotation movement of the carrier ring 33 within the guiding-rail ring 31.

The rolling ball 331 may also be modified as a roller secured on the carrier ring 33 to be rolled in the guiding-rail ring 31.

The present invention is superior to a conventional power generator with the following advantages:

1. By applying magnetic repulsion force between the shuttle magnets 32 and the repulsive magnets 15, 16, the shuttle magnets 32 may easily shuttle in the coil windings 34 for generating power, thereby increasing the power generating efficiency.
2. No brushes are provided for preventing frictional heat and power transmission loss as found in a traditional power generator.
3. Coil windings 34 are wound on an outside of the ring 31 for easily radiating and dissipating heat outwardly to prevent damage to the power generator.
4. The diameter of the fly wheel 1 may be greatly increased for a lighter driving force for rotating the fly wheel, thereby saving input mechanical energy for operating the power generator.

The present invention may be modified without departing from the spirit and scope of this invention.

I claim:

1. A power generator comprising:

a fly wheel means including a fly wheel having at least an extension ring annularly formed on the fly wheel and a plurality of magnetically repulsive magnets circularly secured in said extension ring;

a driving means operatively rotating said fly wheel for rotatably moving said plurality of said repulsive magnets; and a power generating disk means including a guiding-rail ring formed on a mounting disk mounted on a supporting frame, a plurality of shuttle magnets secured in a carrier ring rotatably slidably engageable in the guiding-rail ring adjacent to said extension ring on said fly wheel, and a plurality of coil windings circularly wound on said guiding-rail ring, said magnetically repulsive magnet operatively approximating said shuttle magnet and having one end of said repulsive magnet having a same magnetic polarity as that of one end of said shuttle magnet to allow said repulsive magnet to magnetically repulse said shuttle magnet, whereby upon a rotation of said fly wheel to approximate each said repulsive magnet to each said shuttle magnet, each said shuttle magnet will be magnetically repulsed by each said repulsive magnet to circularly shuttle in said guiding-rail ring to induce an alternating current from each said coil winding for power generation.

2. A power generator according to claim 1, wherein said fly wheel means includes: said fly wheel having a perimeter engageable with the driving means to be rotatably driven by the driving means, a wheel shaft formed at a center of the fly wheel and rotatably mounted on a holder, an inner extension ring and an outer extension ring made of non-magnetic material and concentrically formed on a periphery of the fly wheel, with an annular groove defined between the inner and outer extension rings for rotatably engaging said guiding-rail ring of the power generating disk means, each said extension ring having a plurality of magnetically repulsive magnets equally spaced and circularly secured in each said extension ring, each said magnetically repulsive magnet having two poles of opposite polarity disposed on a front end and a rear end of each said repulsive magnet when the fly wheel is rotated about an axis of the wheel shaft and initiated for rotation from the front end of each said repulsive magnet to the rear end of the repulsive magnet, each said repulsive magnet secured in the inner extension ring radially aligned with each said repulsive magnet in said outer extension ring and two said repulsive magnets in said inner and outer extension rings operatively approximating a rear end of each said shuttle magnet in the power generating disk means with the rear end of the shuttle magnet having a polarity as same as that of the front end of each said repulsive magnet for a magnetic repulsion between each shuttle magnet and each said repulsive magnet.

3. A power generator according to claim 2, wherein said driving means includes: a driving wheel having a driving axle rotatably mounted on a frame, and a transmission means selected from a transmission belt and a chain engageable with the perimeter of the fly wheel selected from a belt groove and a chain pulley formed on the perimeter.

4. A power generator according to claim 3, wherein said driving wheel includes a driving handle pivotally secured to the driving wheel by a pivot for manually rotating the driving wheel.

5. A power generator according to claim 2, wherein said power generating disk means includes: at least one said guiding-rail ring made of non-magnetic material and annularly formed on a mounting disk which is supported on a supporting frame, with the guiding-rail ring rotatably engageable with the annular groove formed in between the inner and outer extension rings on said fly wheel, a plurality of said shuttle magnets equally spaced and circularly secured in a carrier ring each said shuttle magnet having a polarity on a rear end of the shuttle magnet as same as the polarity of a front end of each said repulsive magnet in the fly wheel means when approximating each said repulsive magnet to each said shuttle magnet, said carrier ring made of non-magnetic material and slidably rotatable in the guiding-rail ring, and a plurality of said coil windings equally spaced and respectively wound on the guiding-rail ring to allow each said shuttle magnet circularly shuttling in the guiding-rail ring to induce current from each said coil winding for outputting alternating current from two output leads on two opposite ends of each said coil winding.

6. A power generator according to claim 5, wherein said plurality of said coil windings are parallelly connected to an input of an alternating current transformer for outwardly transmitting an alternating current through an output of the transformer.

7. A power generator according to claim 5, wherein each said coil winding has the two output leads connected to a bridge rectifier for rectifying the alternating current from each said coil winding to a direct current output from a pair of output terminals connected to the bridge rectifier.

8. A power generator according to claim 5, wherein said carrier ring is formed with a plurality of ball recesses recessed in an outer surface of the carrier ring for rotatably engaging a rolling ball in each said ball recess; and the guiding-rail ring is formed with a plurality of annular grooves concentrically in an inside surface of the guiding-rail ring for rotatably engaging each said rolling ball in each said annular groove for a smooth rotation of the carrier ring in the guiding-rail ring, with the plurality of shuttle magnets loaded in the carrier ring being magnetically repulsed by the repulsive magnets secured on the fly wheel.

\* \* \* \* \*